T. C. HOPPER.

COMBINED SCRUBBERS AND CONDENSERS FOR ILLUMINATING GAS.

No. 170,475. Patented Nov. 30, 1875.

Witnesses:
Benj Morison.
Wm H. Morison.

Inventor:
Thomas C. Hopper.

UNITED STATES PATENT OFFICE.

THOMAS C. HOPPER, OF PHILADELPHIA, PENNSYLVANIA.

IMPROVEMENT IN COMBINED SCRUBBERS AND CONDENSERS FOR ILLUMINATING-GAS.

Specification forming part of Letters Patent No. 170,475, dated November 30, 1875; application filed November 8, 1875.

*To all whom it may concern:*

Be it known that I, THOMAS C. HOPPER, of the city of Philadelphia, in the State of Pennsylvania, have invented a machine for separating tar, ammonia, and other condensable products in the manufacture of illuminating-gas, of which the following is a specification:

It is well known that in the distillation of coal or other matter in the manufacture of illuminating-gas there are many impurities to be removed before the gas is rendered suitable for general lighting purposes, and that, to effect said removals, "washing," "scrubbing," "condensing," and "purifying" are generally made use of, and in the order of succession named. The first three named are successively effected by separate mechanical devices, and the last-named by chemical process. The washing cools the gas and removes the heavier products and the ammonia. The scrubbing is effected by passing the gas through a vessel packed with very small pieces of either coke, breeze, brick, or similar material, so that the gas will be compelled to pass through the greatest possible number of very small interstices, and thus, by friction against the surfaces of the packing material, break the minute globules or molecules of the gas, and further arrest the tar and other condensable products left unremoved by the washing operation; and the condensing is effected by a series of pipes so arranged as to further cool the gas gradually, and thus condense and cause to separate therefrom any remaining condensable matter before the gas enters the chemical purifier.

My invention relates exclusively to the mechanical part of the process referred to above; and has for its object the production of a single, compact, portable, and reliable machine for removing all the condensable products above named, the said machine consisting of a hollow cylinder, divided horizontally or transversely into several communicating apartments, through which water is caused to pass, and a central longitudinally-arranged shaft carrying several series of radial arms or beaters, caused to operate at high speed, in combination with the dividing-partitions of the apartments and the inner surface of the hollow cylindrical case, so as to break or crush the globules or molecules of the impure gas, and wash out the tar and ammonia or other condensable products, as will be more fully and clearly described herein, with reference to the accompanying drawing, in which—

Figure 1:
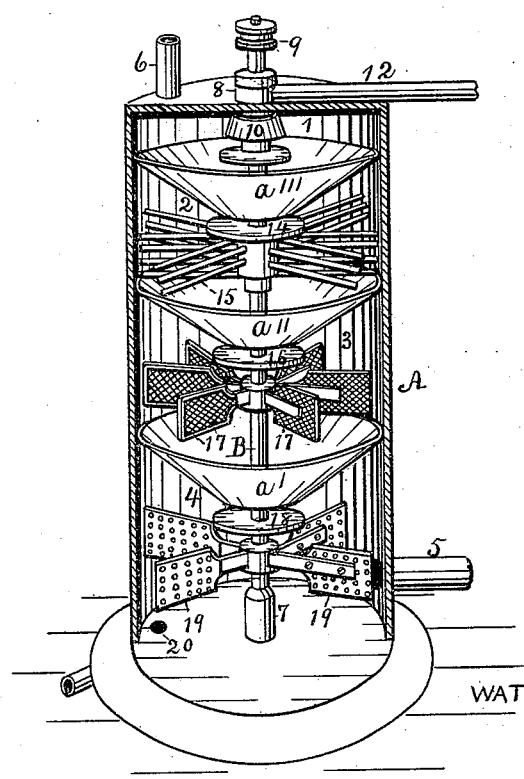
Figure 2:
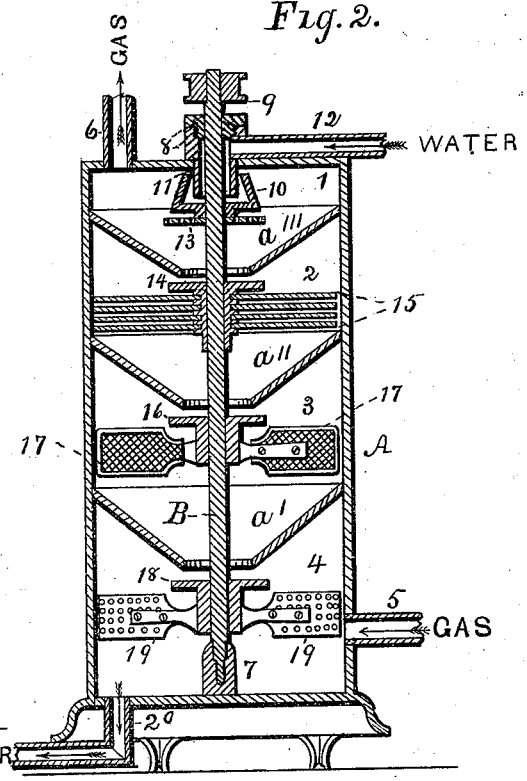
Figure 3:
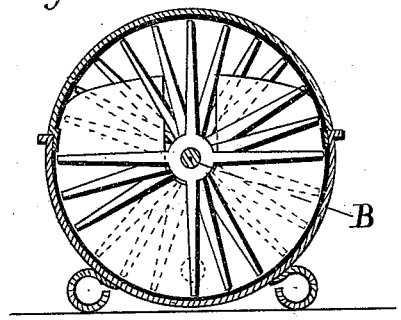
Figure 4:
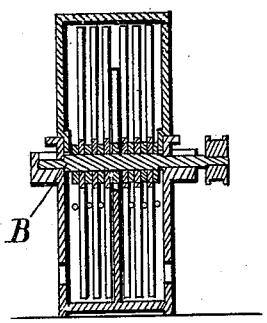

Figure 1 is a perspective view of the interior of the machine, the front half of the hollow cylindrical case being cut away for the purpose of exposing said interior of the machine. Fig. 2 is a vertical or longitudinal central section of the same machine. Figs. 3 and 4 are sectional representations of a modification of the construction of the upper series of the radial beating-arms, which, by impact and centrifugal action upon the water and impure gas, as before stated, remove the condensable impurities.

A is a cylindrical case, closed at both ends, and supported in an upright position by a base or upon feet. The interior of said case is divided horizontally into four communicating apartments, 1 2 3 4, by three partitions, $a'$ $a''$ $a'''$, each in the form of an inverted hollow conical frustum, and with their respective larger ends fixed in gas-tight contact with the surrounding inner surface of the case A. A gas-pipe, 5, in communication with the usual main of a bench of retorts, (not shown,) enters and opens just above the bottom of the case into the same; and another gas-pipe, 6, opens into the upper end of said case, and is intended to extend to and open by its other end into the usual exhauster and chemical purifier. (Not shown.) A central rotary shaft, B, is supported vertically in the case A by a step-bearing, 7, at its lower end, and a collar-bearing, 8, which is screwed into a thimble or short tube, 11, fixed gas-tight in the upper end of A. The upper end of the shaft projects through the collar-bearing 8 to a short distance above it, and has fixed upon it a cord or band pulley, 9, whereby high rotary speed may be given to the shaft with its fixed attachments. Within the case A a water-seal cup, 10, is fixed around the shaft B, at a short distance below the inside of the upper end of A, so as to be carried around by said shaft; and into this cup 10 the lower end of the thimble or tube 11 enters, and extends down into said cup about half the depth of the latter, so that when the said cup is full or overflowing with water the cup and thimble form together a water-seal around the said shaft, which will effectually prevent any of the gas or volatile fluids which may at any time be in the case A, or which may be passing through the same from pipe 5 to pipe 6, from escaping or otherwise passing out between the flange and cup. A water-supply pipe, 12, on the top of the case A opens into the thimble 11, and water from any suitable source is intended to thus enter and overflow the cup 10, and fall upon a perforated disk, 13, which is fast to, and consequently carried around by, the shaft B.

Figure 5:
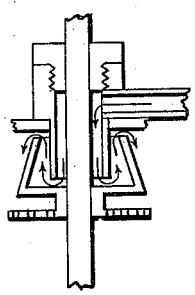

The structure of the water-seal and its water-supplying pipe will be clearly understood by reference to the enlarged diagram marked Fig. 5.

Between the open bottom of the upper partition $a'''$ and the open top of the next partition $a''$ there is fixed around the shaft B a flat horizontal disk, 14, which is about one-third larger in diameter than the opening in the partition $a'''$, and immediately below the disk 14 there are several series of radial arms, 15, fixed to the shaft B, so as to extend nearly to the inside surface of the case A; and between the open bottom of the second partition $a''$ and the open top of the next partition $a'$ there is fixed around the shaft B a flat horizontal disk, 16, like the disk 14, above described, and immediately below the disk 16 there is a series of radial arms fixed to the shaft B, and to each of said arms a woven-wire dasher, 17, is fixed vertically in the same radial direction of the arms, and so as to extend nearly to the inside surface of the case A; and directly below the open bottom of the third partition $a'$ there is fixed around the shaft B a flat horizontal disk, 18, like the disk 14 or 16, before described, and immediately below said disk 18 there is a series of radial arms fixed to the shaft B, and to each of said arms a perforated metallic plate is fixed vertically in the same radial direction of the arms, and so as to extend nearly into contact with the inside surface of the case A, all substantially as represented in Figs. 1 and 2.

Opening through the bottom of the case A there is a waste-pipe, 20, through which the condensable impurities of the gas are carried out by the gravitating water which enters through pipe 12.

The operation of this machine is as follows, viz: Gas, being admitted from the usual main (not shown) through the pipe 5, ascends upward through the central openings in the bottom of the successive partitions $a'$ $a''$ $a'''$, and out through the exit-pipe 6. The washing-water, from any suitable source, enters through the pipe 12 into the water-seal cup 10, overflows from the latter, falls down upon the successive disks 13 14 16 18, and through the openings in the respective centers of the partitions $a'''$ $a''$ $a'$ to the outlet-pipe 20, when the central shaft B is not in motion; but when the said shaft B is put in rapid rotary motion, as it must be when the machine is used, the centrifugal action of the dashers and arms 19 17 15, and of the disks 18 16 14 13, drives the gravitating water and ascending gas together violently against the inner surface of the case A. The water, with whatever of tar, ammonia, or other condensable impurities liberated by the centrifugal action of the machine, together with the rapid impacts of the radial arms, and the enforced passage of the gas through the interstices of the beaters 19 and 17, while the water is passing down over the partitions and disks from the disk 10 to the bottom of A, and the gas rising from pipe 5 to pipe 6, the globules or molecules of the impure gas, together with water, are dashed against the sides of the case, and rapidly struck by the beaters, and are also forced through the interstices of the two series 19 and 17 in such a rapid and violent manner, as the gas passes upward to the outlet-pipe 6, as to effectually break up the globules or molecules of the impure gas, and thus free the latter from all the condensable products, and discharge the purified gas through the pipe 6, while the impurities are carried down by the gravitating water and discharged through the outlet-pipe 20.

Figs. 3 and 4 represent a somewhat more complicated modification of the radial series of arms shown at 15 in Figs. 1 and 2, by arranging the said arms spirally as well as radially, and causing them to pass through a corresponding series of parallel horizontally or diametrically arranged straight bars, so as to produce a more severe beating action upon the gas; but the construction of this part of my machine, as shown in Figs. 1 and 2, will be thoroughly effective for the purpose.

I claim as my invention—

A machine consisting of a case, A, provided with inlet and outlet pipes, for gas and water, respectively, and a series of communicating chambers, separated by partitions $a'$ $a''$ $a'''$, in combination with a rotary shaft, B, carrying several series of beaters, 19 17 15, and disks 13 14 16 18, substantially as and for the purpose hereinbefore described.

THOMAS C. HOPPER.

Witnesses:
BENJ. MORISON,
WM. H. MORISON.